United States Patent [19]
Szewczyk

[11] 4,215,482
[45] Aug. 5, 1980

[54] POSITION OF A WORKPIECE IN A ROLL TURNING LATHE

[75] Inventor: Richard S. Szewczyk, Rochester, N.Y.

[73] Assignee: USM Corporation, Farmington, Conn.

[21] Appl. No.: 898,830

[22] Filed: Apr. 21, 1978

Related U.S. Application Data

[63] Continuation of Ser. No. 697,574, Jun. 18, 1976, abandoned.

[51] Int. Cl.$^2$ .............................................. G01B 5/25
[52] U.S. Cl. .............................. 33/181 R; 33/180 R; 33/178 D; 33/185 R; 33/412
[58] Field of Search ............ 33/181 R, 180 R, 185 R, 33/178 D, 174 L, 172 R, 412; 51/165

[56] References Cited

U.S. PATENT DOCUMENTS

| | | | |
|---|---|---|---|
| 2,468,395 | 4/1949 | Fredin | 33/185 R |
| 2,749,673 | 6/1956 | Balsiger | 33/181 |
| 3,281,995 | 11/1966 | Parrella et al. | 51/165 |

*Primary Examiner*—Willis Little
*Attorney, Agent, or Firm*—Donald N. Halgren; Richard B. Megley; Vincent A. White

[57] ABSTRACT

This invention involves an indicator assembly and method for locating the position of the axis of a cylindrical workpiece in a roll turning lathe in order to allow accurate adjustment of the workpiece axis position into alignment with the turning axis of the lathe. The assembly is removably mounted on the tool slide of the lathe for radial movement into engagement with the workpiece, and is constructed to locate the relative position of the workpiece and machine axes in horizontal and vertical coordinates. This apparatus is used in the method to compare the position of the cylindrical surface of the faceplate of the lathe with the position of the surface of the journal of the roll in the horizontal coordinate and to compare the position of the axis of the faceplate with the position of the axis of the journal in the vertical coordinate.

5 Claims, 7 Drawing Figures

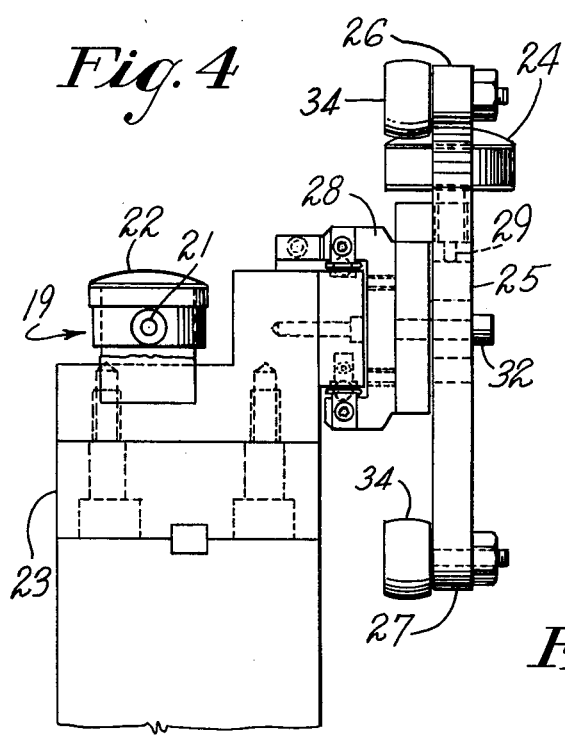
Fig. 4
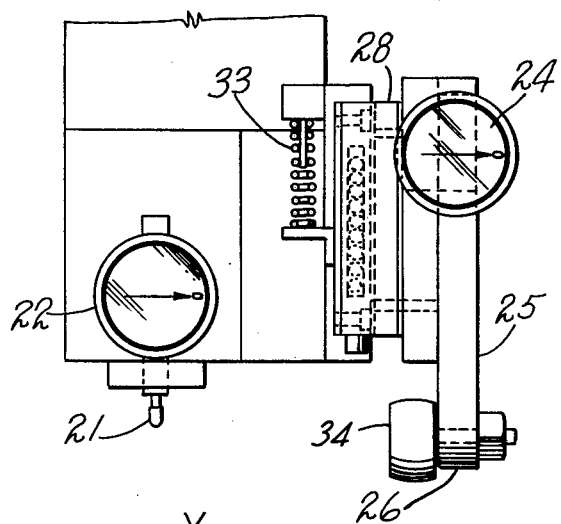
Fig. 5
Fig. 7
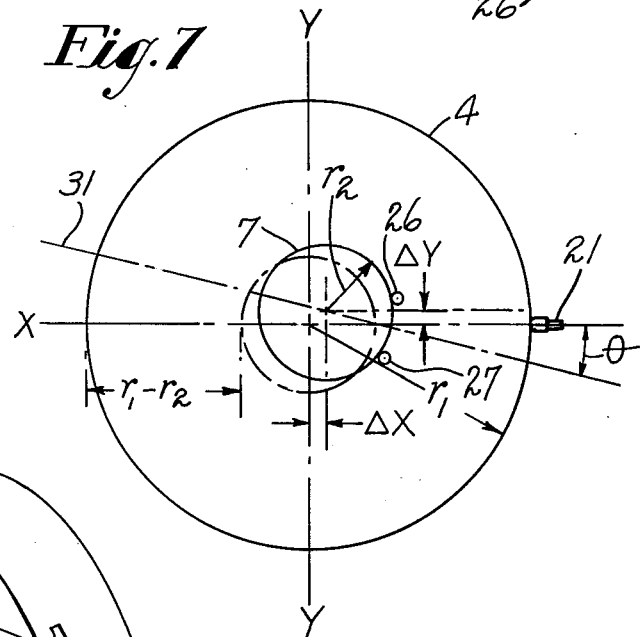
Fig. 6
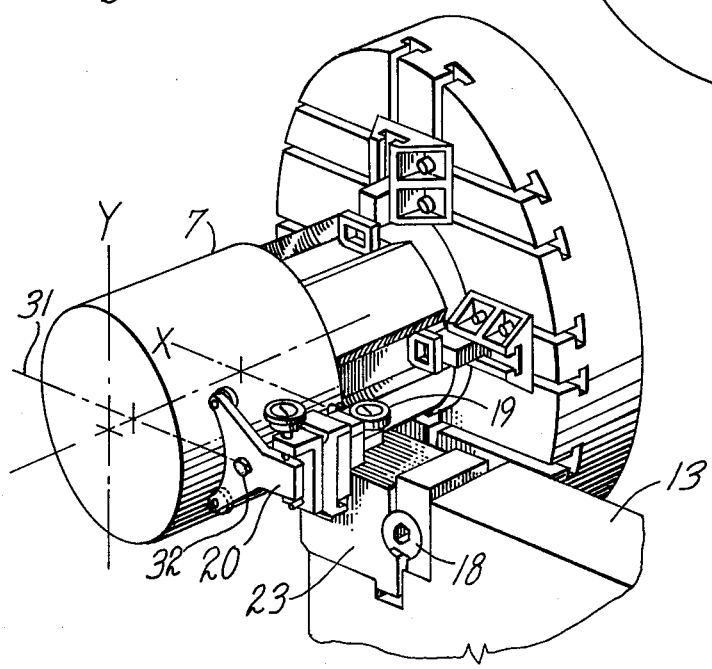

POSITION OF A WORKPIECE IN A ROLL TURNING LATHE

This is a continuation of application Ser. No. 697,574, filed June 18, 1976, now abandoned.

BACKGROUND OF THE INVENTION

In the normal operation of a lathe, a workpiece is mounted with its axis coincident with the spindle axis of the lathe and is turned about said axis. A tool is moved radially into engagement with the turning workpiece and material is removed as the workpiece turns. The tool is also translated along a track parallel to the turning axis of the lathe to allow for operative engagement of the tool along the length of the workpiece. By varying the radial and lateral position of the tool, a wide variety of shapes can be obtained. In order to insure that the finished shape is symmetrical about the axis of the workpiece, it is essential that the workpiece axis be accurately aligned with the spindle or turning axis of the lathe. Generally, the workpiece is constructed with cylindrical end portions called journals and the axis of these portions are accurately located and may be engaged by the spindle. However, in certain instances, the axis of the workpiece is not obvious and the spindle cannot accurately be engaged. Also in some operations, the workpiece is supported solely from below on steady rests without help from the spindle engagement. In these instances, alignment of the workpiece and spindle axes is more difficult and additional means are required to affect this adjustment.

This adjustment was generally accomplished by the use of an appropriate gauge which would indicate position of the journal surface in relation to the spindle axis. This gauge is attached to an arm which is secured to the faceplate of the lathe for rotation therewith. In operation, the gauge would be positioned in contact with the journal surface and rotated while the workpiece is still. Deflections of the gauge would indicate a lack of concentricity between the faceplate and the journal surface. By adjusting the steady rest until there is no deflection, the axis can be aligned. However, because of the awkward position of the gauge, adjustment of one end continuously requires readjustment of the opposite end gradually minimizing the deflection until it is zero. This operation may take hours to accomplish, due to the cumbersome and inaccurate nature of the gauge assembly. In many instances, the alignment process may take longer than the actual turning operation.

The indicator of the subject invention is more accurate, and easier to handle and results in a substantial reduction in the time needed to set up and align the axis of the workpiece with the spindle axis of the lathe.

BRIEF SUMMARY OF THE INVENTION

An indicator assembly is provided to facilitate steady rest adjustment in a roll turning lathe for the purpose of aligning the axis of the roll with the turning axis of the lathe. The assembly is constructed to be removably secured to the tool slide in the same manner as the tool and consists of two gauges, one of which is sensitive to position error in the vertical coordinate and the other of which being sensitive to position error in the horizontal coordinate. To check the position of the journal axis in the vertical or y-coordinate, a y-shaped yoke is constructed with two probe elements extending towards the roll. This yoke is situated on the indicator assembly for contact with the journal or faceplate as the tool slide is moved radially inward. The yoke is mounted on the indicator assembly for pivotal motion in a plane perpendicular to the journal or turning axis of the roll. Pivotal motion of the yoke causes deflection of the y-coordinate gauge. By engagement of both y-coordinate probes on the circumference of the faceplate, a zero position in y coordinates for the turning axis can be obtained. The indicator may then be moved to the journal surface and engaged therewith. If the journal axis is out of position in the vertical coordinate, the yoke will necessarily pivot to allow both probes to engage the surface of the journal. The resulting deflection registered on the y-coordinate gauge will be indicative of the required adjustment of the steady rest in the y or vertical coordinate.

To insure accuracy, it is also necessary to check the position of the journal axis in the horizontal or x-coordinate. To accomplish this, a horizontal or x-coordinate position gauge is operatively connected to a retractable probe which is spring biased toward the journal surface of the roll and may be moved into engagement with said surface along the x-coordinate by appropriate movement of the tool slide. In operation the gauge is calibrated to the radius of the faceplate of the lathe. The difference in radius between the faceplate and the journal is then calculated and the gauge is moved toward the journal an amount equal to said difference. If there is a deflection registered on the gauge, it indicates an amount of adjustment required to correct the error in this coordinate.

DESCRIPTION OF THE DRAWING

This invention is more fully described in conjunction with the appended drawing and in said drawing:

FIG. 4 is a front view of the indicator assembly of this invention;

FIG. 5 is a top view of the indicator assembly of this invention;

FIG. 6 is a perspective view of the indicator assembly of this invention in its operating position; and FIG. 7 is a chart illustrating the geometry of the method and apparatus of this invention.

DETAILED DESCRIPTION OF THE PREFERRED EMBODIMENT

Figure 1:
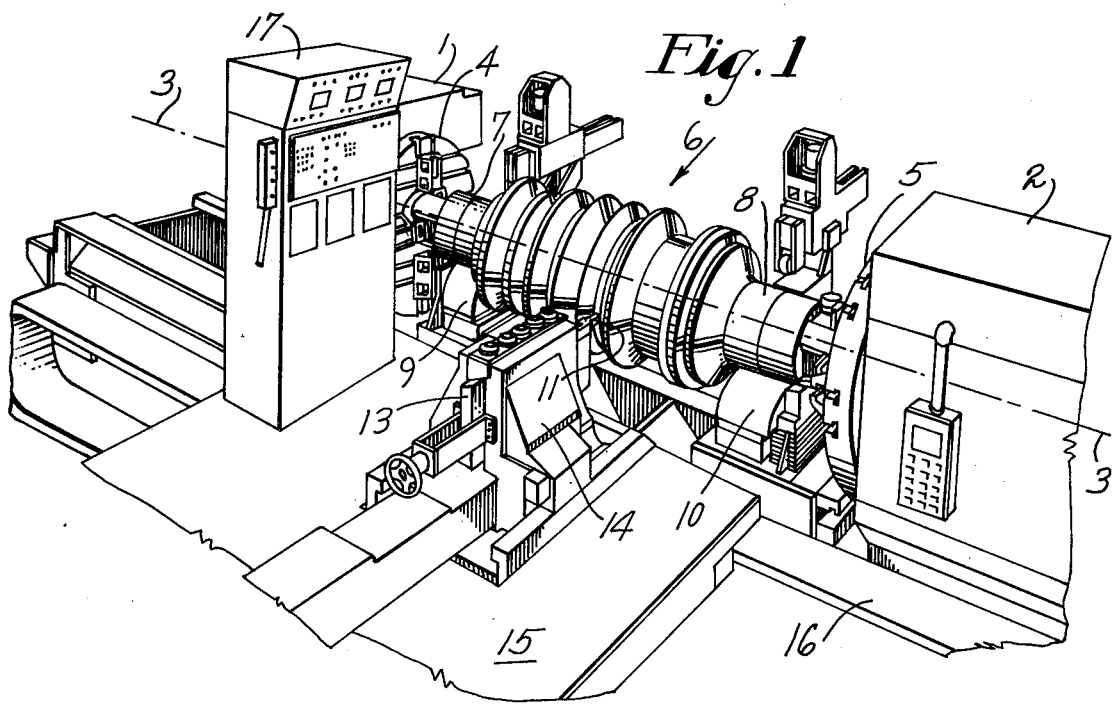
FIG. 1 is a schematic perspective view of a roll turning lathe on which the invention may be used.

The subject invention is designed for use with a roll turning lathe as shown in FIG. 1. The basic machine consists of a head stock 1 and a tail stock 2 having a common turning axis 3. The head stocks 1 and 2 have faceplates 4 and 5 mounted thereon for rotation about the axis 3. The faceplates 4 and 5 provide true cylindrical surfaces on the turning axis of the machine for calibrating the gauge of the indicator assembly of this invention.

A typical roll 6 is mounted between the head stock 1 and tail stock 2 and is constructed with journals 7 and 8 which provide accurate cylindrical surfaces that are concentric with the desired axis of the roll 6 for alignment. The roll 6 is supported on steady rests 9 and 10.

Figure 2:
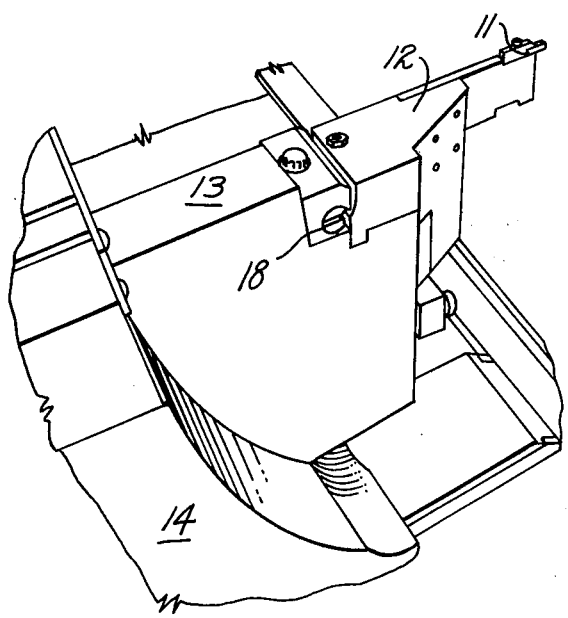
FIG. 2 is a perspective view of a tool slide and block assembly of the type which may be used to mount the subject invention.
Figure 3:
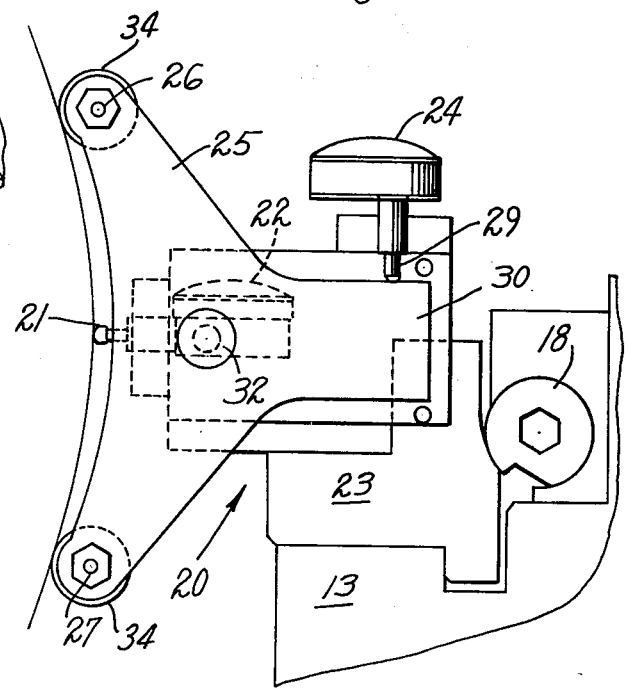
FIG. 3 is a side view of the indicator assembly of this invention.

As shown in FIG. 2, the tool 11 of this lathe is mounted on a tool block 12 which is releasably secured to a tool slide 13. The tool slide 13 provides a rough manual adjustment of the tool 11 in a direction transverse to the roll axis. The tool slide 13 is mounted in a cross slide 14 which provides further transverse adjustment of the tool position. The tool assembly consisting of tool 11, tool block 12, tool slide 13 and cross slide 14 is mounted on carriage 15 which can be translated axially along the length of roll 6 on rail 16. The movement of the cross slide 14 and the carriage 15 may be automatically controlled by an electronic control unit 17 mounted on the carriage 15.

As shown in FIG. 2 the tool block 12 is releasably secured by a cylindrical cam 18 mounted for rotation on the tool slide 13. The shape of the cam is constructed to engage the tool block and rigidly secure it in operative position. By mounting the indicator of this invention on a block similar to tool block 12, as shown in FIG. 6, the identical mechanism can be used to releasably secure the indicator assembly to the tool slide 13.

The indicator assembly of this invention is best shown with reference to FIGS. 3 through 6 and consists of two gauge actuating units, one unit 19 for indicating axis position in the horizontal or x-coordinate and one unit 19, for indicating axis position in the horizontal or x-coordinate.

The y-coordinate indicator 20 includes a gauge 24 operatively connected to the stem 30 of a y-shaped yoke 25 which is mounted on the indicator block 23 for pivotal movement about bolt 32 in a plane perpendicular to the turning axis 3 of the lathe. The branches of the yoke 25 form probe elements 26 and 27 which extend inward towards the axis 3. Each probe element 26 and 27 includes a rotatable wheel 34 attached thereto, which rollingly rides on the cylindrical surface to be measured, preventing damage to that surface by sliding friction thereon, and permitting the yoke 25 to more easily pivot about its bolt 32. The plunger 29 of gauge 24 engages the stem 30 of yoke 25. Therefore, pivotal motion of the yoke 25 will result in a proportional deflection of the gauge 24. Actuation of the y-coordinate indicator 20 may be initiated simultaneously with the x-coordinate indicator 19. Therefore, movement of the x-coordinate probe 21 into engagement with faceplate 4 will also result in engagement probes 26 and 27 on the cylindrical surface of faceplate 4. The indicator 20 is mounted on block 23 by means of a ball slide 28 to allow for a certain amount of retraction of the assembly 20 to accommodate different diameter faceplates or rolls. Indicator 20 is biased towards the roll or faceplate surface by spring 33.

In operation, the contact points of probes 26 and 27 define a circumferential arc on the cylindrical surface of the faceplate 4 or journal 7 and since the longitudinal axis 31 of the yoke 25 bisects this arc, it is geometrically necessary that this axis intersects the journal or machine axis. Initially the y-indicator probes 26 and 27 are brought into contact with the faceplate surface and the gauge 24 is calibrated at zero which would indicate the position of the turning axis 3 in the y-coordinate. The y-indicator assembly 20 is then moved into engagement with the cylindrical surface of journal 7 until both probes 26 and 27 are in firm contact. If there is a position error in the y-coordinate, axis 31 will pivot through an angle as shown in FIG. 7. This deflection will be proportional to the distance that the journal axis is off center and the steady rest may be adjusted until the deflection is eliminated.

The x-indicator 19 includes a probe 21 operatively connected to a gauge 22 and is directly mounted on indicator block 23 for movement therewith. The probe 21 is slidably mounted in the indicator block 23 for radial movement in the x-coordinate and retraction or extension of the probe 21 will result in a proportional deflection of the gauge 22. The relative positions of the x and y-coordinates are shown in FIGS. 6 and 7. In operation, the tool carriage 15 is translated to the faceplate and the tool slide is actuated to move the probe 21 into engagement with the surface of the faceplate. After a desired amount of deflection is obtained, the gauge is calibrated to its zero point which indicates the radius of the faceplate. By measuring the radius of the faceplate and the radius of the journal, the difference of these values may be obtained. The x-gauge 22 is then translated on carriage 15 to the journal 7. If the position of the journal axis in the x-coordinate is coincident with the turning axis of the machine, the journal surface should be engaged after the probe 21 is moved radially towards journal 7a distance equal to the difference in radii of the faceplate and journal. If after moving this distance, a deflection occurs, the journal axis position is off center and the steady rest may be adjusted to remove the deflection.

This process is repeated on both ends of the machine to insure proper alignment. Since the movement of the indicator assembly is very flexible because of its support on the cross slide and tool carriage, the adjustment readings can be taken at the pivot axis of the roll. This will substantially limit the error caused by separate adjustment of each end and reduce the need for repetitive and time consuming realignment of each end.

Referring to FIG. 7, the geometry of the subject invention can be observed. The cross sections illustrated show the axis of the roll journal 7 displaced from the axis of the faceplate 4a distance $\Delta x$ in the horizontal coordinate and a distance $\Delta y$ in the vertical coordinate.

The axis 31 of the gauge 24 having been calibrated to the surface of faceplate 4, will deflect through an angle as the probes 26 and 27 pivot into engagement with journal 7. The angle is observed to be directly proportional to error ($\Delta y$) in the y-coordinate. By adjusting steady rest 9 to eliminate the deflection, alignment along the y-coordinate can be accomplished.

It can be seen that the relative radial positions of the surfaces of faceplate 4 and roll journal 7 in the x-coordinate should be the difference in the radii of the two surfaces or $r_1 - r_2$. Therefore, by calculating this value and adjusting the position of the probe 21 towards the journal 7a distance equal to $r_1 - r_2$, the amount of error present ($\Delta x$) can be ascertained. If the gauge 22 is calibrated to the surface of the faceplate, a deflection proportional to dx will be indicated. By adjusting the steady rest 9 until there is no deflection, alignment along this coordinate is obtained.

I claim:

1. An alignment device for use in determining whether a first and a second lingitudinally adjacent cylindrical members are each coaxially aligned with one another on a turning machine, the alignment device comprising:

a first gauging means for detecting a misalignment of the axis of the first cylindrical member in respect to the horizontal plane aligned with the axis of rotation of the second cylindrical member;

a second gauging means for detecting a misalignment of the axis of the first cylindrical member in respect to the vertical plane aligned with the axis of rotation of the second cylindrical member;

said first and second gauging means both being mounted on a movable support to one side of the axis of rotation of said turning machine, said support being movable to permit movement of said first and second gauging means parallel to the axis of rotation of said second cylindrical member, both of said gauges being mounted on the side of the axis of rotation of said turning machine to permit a large variation in the diameters of any first cylindrical members to be aligned and turned thereon;

said first gauging means comprising a first probe constructed to make contact with a cylindrical surface at two points spaced apart on a circumference of the cylindrical surface, said probe being mounted for pivotal movement in a plane containing the two points of contact and their circumference;

a first deflection indicator of said gauging means mechanically arranged to indicate pivotal movement of the first probe in said plane; and said second gauging means comprising a second probe constructed to make contact with a cylindrical surface at one point thereon intermediate said two points contacted by said first probe, said second probe having a second deflection indicator mechanically arranged therewith to indicate linear displacement of said second probe, said first and second gauging means both being juxtaposed on said movable support to permit ease of coaxial alignment of said first and second cylindrical members.

2. An alignment device as recited in claim 1, wherein said first probe comprises a roller disposed at each of the two points that make contact with the cylindrical surface.

3. An alignment device as recited in claim 1, wherein said first probe is also mounted for linear movement along a path parallel to said plane.

4. An alignment device as recited in claim 3, wherein said first probe is resiliently urged along said path in a direction towards the cylindrical surface to be contacted.

5. An alignment device as recited in claim 4, wherein said second probe is biasedly arranged for linear displacement along a path parallel to said plane in which said first probe is pivotally movable.

* * * * *